United States Patent [19]
Widner

[11] Patent Number: 5,853,020
[45] Date of Patent: Dec. 29, 1998

[54] MINIATURE COMBINATION VALVE AND PRESSURE TRANSDUCER AND SYSTEM

[76] Inventor: Ronald D. Widner, 2811 Pasatiempo Glen, Escondido, Calif. 92025

[21] Appl. No.: 494,159

[22] Filed: Jun. 23, 1995

[51] Int. Cl.[6] .................................................. B60C 23/04
[52] U.S. Cl. .......................... 137/227; 137/557; 73/146.5; 340/447
[58] Field of Search .................................. 137/227, 557, 137/234.5; 73/146.5, 146.8, 754, 755; 340/447

[56] References Cited

U.S. PATENT DOCUMENTS

| | | | |
|---|---|---|---|
| 1,804,209 | 5/1931 | Cowperthwait | 137/227 X |
| 3,031,591 | 4/1962 | Cary et al. | 73/754 X |
| 3,697,917 | 10/1972 | Orth et al. | 73/754 X |
| 3,717,030 | 2/1973 | McGhee | 73/146.5 |
| 4,015,623 | 4/1977 | Wanstreet | 137/224 |
| 4,015,624 | 4/1977 | Wanstreet | 137/224 |
| 4,048,614 | 9/1977 | Shumway | 340/58 |
| 4,097,075 | 6/1978 | Clayton | 137/234.5 X |
| 4,143,545 | 3/1979 | Sitabkhan | 73/146.8 |
| 4,174,515 | 11/1979 | Marzolf | 340/58 |
| 4,177,671 | 12/1979 | Ichihara | 73/146.5 |
| 4,475,578 | 10/1984 | Nidle | 152/415 |
| 4,562,874 | 1/1986 | Scheller | 152/427 |
| 4,567,460 | 1/1986 | Gebler | 73/146.5 X |
| 4,686,855 | 8/1987 | Smith | 340/447 X |

(List continued on next page.)

OTHER PUBLICATIONS

Ph. Dondon, Ch. Zardini and J.L. Aucouturier, BiCMOS Integrated circuit for capacitive pressure sensors in automotive applications, Sensors and Actuators A, pp. 596–599, No. 37–38 (1993).

H. Dudaicevs, M. Kandler, Y. Manoli, W. Mokwa and E. Spiegel, Surface micromachined pressure sensors with integrated CMOS read–out electronics, Sensors and Actuators A, pp. 157–163, No. 43 (1994).

Rajendra P. Agarwal, A very low–cost pressure sensor with extremely high sensitivity, Sensors and Actuators A, pp. 417–240, No. 41–42 (1994).

Lars Rosengren, Pelle Rangsten, Ylva Backlund, Bertil Hok, Bjorn Svedbergh, and Goran Selen, A system for passive implantable pressure sensors, Sensors and Actuators A, pp. 55–58, No. 43 (1994).

L. Fraigi, D. Lupi and L. Malatto, A thick–film pressure transducer for cars propelled by natural gas, Sensors and Actuators A, pp. 439441, No. 41–42 (1994).

M. A. Chan, S. D. Collins, and R.I. Smith, A micromachined pressure sensor with fiber–optic interferometric readout, Sensors and Actuators A, pp. 196–201, No. 43 (1994).

Robert Puers, Capacitive sensors: when and how to use them, Sensors and Actuators A, pp. 93–105, No. 37–38 (1993).

P. Wouters, M. De Cooman, D. Lapadatu, and R. Puers, A low power multi–sensor interface for injectable microprocessor–based animal monitoring system, Sensors and Actuators A, pp. 198–206, No. 41–42 (1994).

(List continued on next page.)

*Primary Examiner*—John Rivell
*Attorney, Agent, or Firm*—Brown, Martin, Haller & McClain

[57] ABSTRACT

A valve/transducer and system for pressure measuring: which has a valve/transducer (24) comprised of an appropriately dimensioned tapered barrel (30) of rigid material with a gasket (40) near the barrel's larger diameter proximal end. The valve/transducer has an opening closable by valve cup (32) which is operated by a pin (34) extending from the barrel. The valve/transducer has within the barrel an integrated silicon circuit (44) and flex circuit electrical interface (76). The integrated circuit provides a pressure transducer (58) and an integrated processor/encoder (68). The system includes wireless transmitter/receiver paired circuits consisting of a transponder (26) and a transmit/receive channel circuit (164). The system includes a control/display processor (162) and an indicator (182) with novel displays of useful tire inflation and maintenance parameters.

16 Claims, 10 Drawing Sheets

U.S. PATENT DOCUMENTS

| | | | |
|---|---|---|---|
| 4,695,823 | 9/1987 | Vernon | 340/447 |
| 4,702,754 | 10/1987 | Blocker | 55/274 |
| 4,704,901 | 11/1987 | Rocco, et al. | 73/146.8 |
| 4,734,674 | 3/1988 | Thomas et al. | 340/447 |
| 4,737,760 | 4/1988 | Chung-Siang | 340/58 |
| 4,748,845 | 6/1988 | Rocco et al. | 73/146.8 |
| 4,816,802 | 3/1989 | Doerksen | 340/447 |
| 4,819,686 | 4/1989 | Achterholt | 137/229 |
| 4,884,593 | 12/1989 | Chen | 137/557 |
| 4,901,747 | 2/1990 | Yabor | 137/229 |
| 4,909,074 | 3/1990 | Gerresheim et al. | 73/146.5 X |
| 4,918,423 | 4/1990 | Fukuyama et al. | 73/146.8 X |
| 4,944,323 | 7/1990 | Bartholomew | 137/227 |
| 4,951,501 | 8/1990 | MacAnally | 73/146.8 |
| 4,951,502 | 8/1990 | Dorfle | 73/146.5 |
| 4,998,092 | 3/1991 | Ohno | 340/445 |
| 5,027,848 | 7/1991 | Leeuwen | 137/227 |
| 5,040,561 | 8/1991 | Achterholt | 137/227 |
| 5,040,562 | 8/1991 | Achterholt | 137/227 |
| 5,054,315 | 10/1991 | Dosjoub | 73/146.5 |
| 5,083,457 | 1/1992 | Schultz | 73/146.5 |
| 5,115,832 | 5/1992 | Higdon | 137/227 |
| 5,140,851 | 8/1992 | Hettich | 73/146.5 |
| 5,193,387 | 3/1993 | Hodate | 73/146.5 |
| 5,218,861 | 6/1993 | Brown | 73/146.5 |
| 5,228,337 | 7/1993 | Sharpe | 73/146.5 |
| 5,231,872 | 8/1993 | Bowler | 73/146.5 |
| 5,289,160 | 2/1994 | Fiorietta | 340/447 |
| 5,289,161 | 2/1994 | Huang | 340/447 |
| 5,297,424 | 3/1994 | Sackett | 73/146.5 |
| 5,335,540 | 8/1994 | Bowler | 73/146.5 |

OTHER PUBLICATIONS

B. Puers, P. Wouters, and M. De Cooman, A low power multi–channel sensor interface for use in digital telemetry, Sensors and actuators A, pp. 260–267, No. 37–38 (1993).

A. J. Jocobs–Cook and M. E. C. Bowen, Novel optical fibre/microresonator interfacing technology, Sensors and Actuators A, pp. 540–545, No. 37–38 (1993).

Randy Frank, Silicon sensors—merging of microstructures and microcircuits, Microelectronics Manufacturing Technology, pp. 32–37, Dec. 1991.

Lucas NovaSensor, NPP Series surface mount pressure sensor NPP–301, Lucas NovaSensor preliminary data sheet, Dec. 1994.

Figure 2A - Prior Art Valve Core
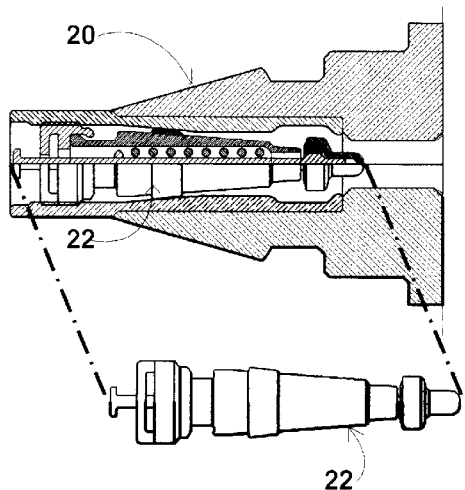
Figure 2B - Prior Art Stem Modification
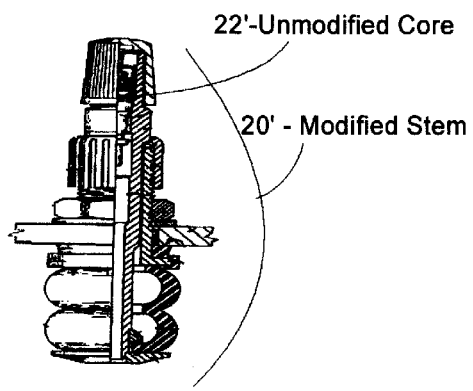
Figure 2C - Prior Art
Aircraft Tire Stem & Core
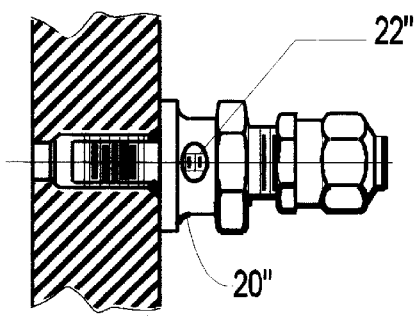

44 (Side View)

44 (Top View)

44 (Bottom View)

Axial View of Twist Capsule

Figure 10A
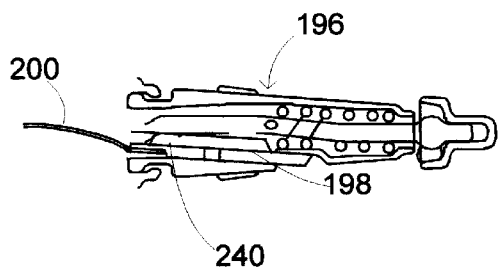
Figure 10B
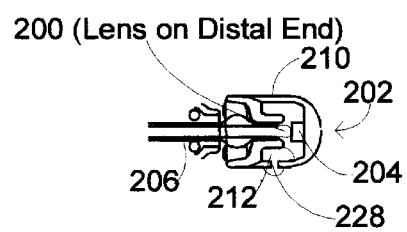
Figure 10C
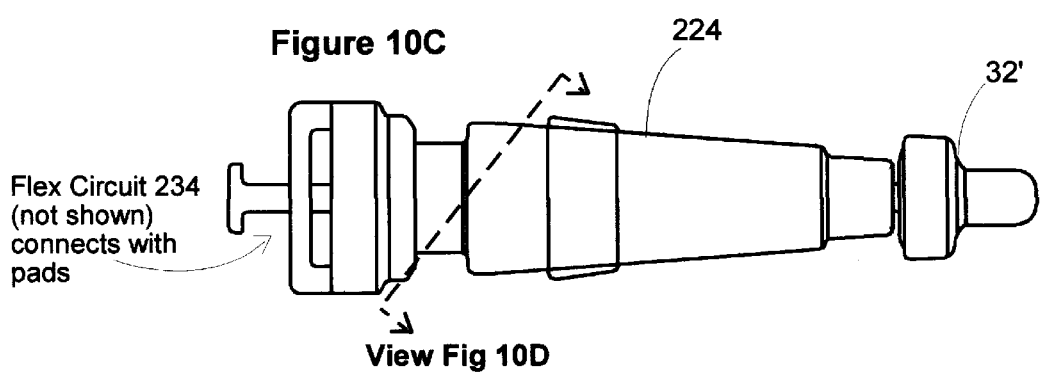
Figure 10D
Figure 10E
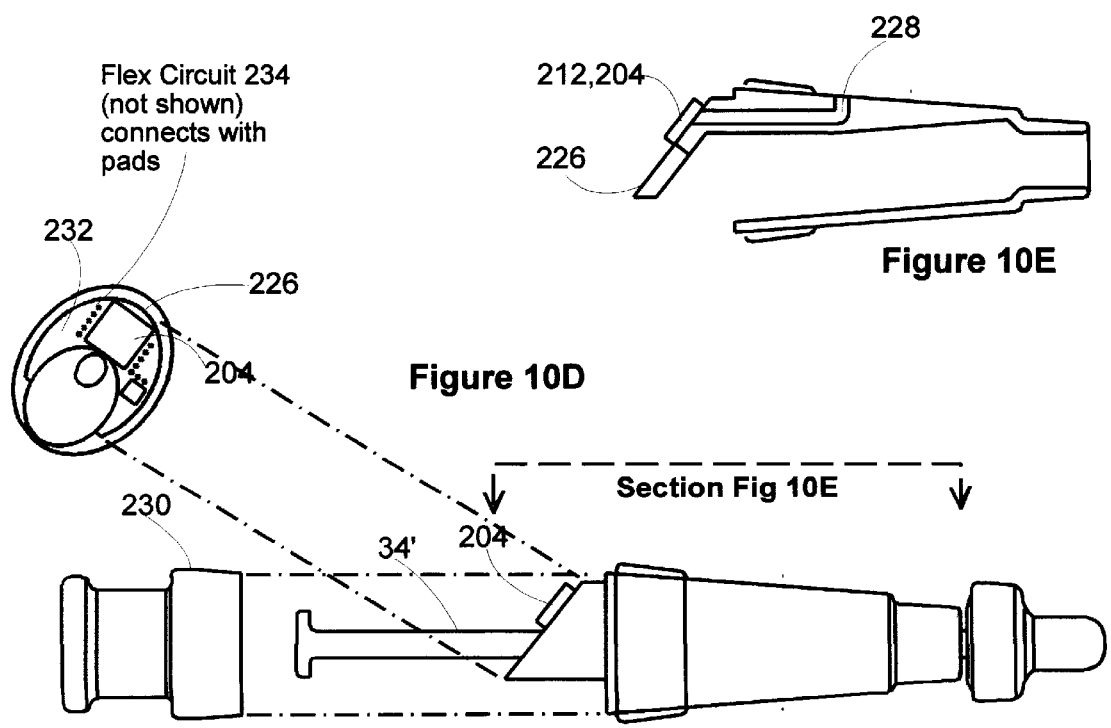

MINIATURE COMBINATION VALVE AND PRESSURE TRANSDUCER AND SYSTEM

BACKGROUND—FIELD OF INVENTION

This invention is related to pressure measuring and signaling and, in particular, a miniature valve combined with a pressure transducer.

BACKGROUND—PRIOR ART

In practice an acceptable or unacceptable condition of vehicular tire inflation is determined by measuring tire interior pressure and evaluating whether measured pressure lies in an acceptable pressure range which varies with temperature and load. Because such measurements have been difficult to perform on an operating vehicle's tires, alternative methods involving complex systems to measure wheel rotation rate differences have been tried. However, direct pressure measurement and evaluation is the preferred method. There are numerous prior inventions to provide a tire mounted device which generates a pressure indicating signal. All known prior inventions suffer from one or several of four technical flaws which prevent their widespread utility. Either the prior inventions are (1) arguably impractical for use, and/or (2) they do not have sufficient accuracy and precision to reliably perform the pressure indicating function, and/or (3) they leak air from the tire, and/or (4) they require special modifications of the tire or wheel for attachment (therefore, are not easily retrofittable). Additionally, all prior art devices lack significant commercial potential when compared with the present invention.

Technical Deficiencies of Prior Art

Impractical Function

My first objection to the prior art is that device functions are complex and impractical. For example, U.S. Pat. No. 4,819,686 issued to Achterholt on Apr. 11, 1989 and other prior art devices have a reference chamber which inflates upon attachment of the signaling device to an inflated tire. Afterward combinations of springs, diaphragms, bellows, and/or electrical or mechanical indicating components monitor the drop in pressure between the reference chamber and the interior of the tire. Upon detecting sufficient pressure drop, they issue an under inflation alarm. I question the reliable and economic realization of such devices. I believe it very difficult for inexpensive devices to inflate the reference chamber to a proper pressure, to seal and maintain the reference pressure at an accurate level, and to preserve the interior tire pressure during the initial attachment of the device and thereafter during the tire's operation.

Insufficient Accuracy

A second objection is in regard to measuring accuracy of prior art devices. Complex devices (such as U.S. Pat. No. 4,737,760 to Huang and Kuo on Apr. 12, 1988 and including the type previously described) implemented with mechanically manufactured springs, diaphragms, bellows, balloons, and the like indicating components are typically imprecise when manufactured cheaply. Further complicating implementation is the requirement that the indication must compensate for the known temperature dependency of pressure to produce suitable results. I question whether the majority of prior art devices can achieve the required accuracy and temperature compensation. This includes devices under U.S. Pat. No. 4,695,823 issued Sep. 22, 1987 to Vernon that, although sensing both pressure and temperature, would not provide any means of compensation because of its using one-bit binary threshold comparison rather than providing an analog or numeric value. Finally, accurate inflation assessment should account for vehicular weight and loading variations. Present devices which indicate under inflation fail to do this.

Prone to Leak

I also find unsuitable the typical arrangements for installation of existing devices. Either they will be retrofittable onto tire stems by end users or require unretrofittable (by end users) modifications. For the former case, the method of installation makes the device prone to leak. In the latter case see the following titled paragraph. The two previous devices (Achterholt and Huang/Kuo) and U.S. Pat. No. 5,040,562 to Achterholt on Aug. 20, 1991, open the tire's existing valve to admit the interior tire pressure to the indicating device when they are attached to the tire. This valve opening overrides the proven sealing method of the valve core and stem. The alternative pressure sealing provided within the indicating cap are inferior sealing methods. My argument for this requires a review of the valve core and stem sealing and then a comparison of the inferior replacement sealing.

The pressure seal of a normal tire inflation valve is in two parts. The first part is a moveable cup and elastic seal which opens for admitting or releasing air from the tire. When closed, the elastic seal is compressed between the cup and the end of the valve core by a spring force. The tire interior pressure also acts on the cup with closing forces rather than opening forces. The seal has a comparatively large ratio of its radial thickness to its circumference. This ensures that potential air leaking channels which might develop radially outward between the tire stem and seal become closed prior to their reaching the opposite lower-pressure side of the seal ring. The second sealing part is a relatively wide elastic band or gasket pressed against a precision interior surface of the stem. This surface's sole function is as a seat for sealing the valve core gasket. Its condition is protected from damage by its interior position in the tire stem. The tire valve is constructed so that during installation sealing surfaces mate to one another without their relative rotation. This construction has proven to be very reliable in commercial practice for maintaining interior tire pressure.

In contrast, the seal objected to in prior art inventions is (usually) an elastic seal which compresses between the exterior of the tire inflation stem and the indicating device. This seal is less reliable than the conventional tire valve for the following reasons. First consider the tire inflation stem end surface, whose normal function is as a temporary seat for inflating chucks and for attaching of a non-pressure sealing dust cover. This surface can easily become burred or nicked from a number of causes without affecting its normal function. A principle cause of damage is likely to be the very air chucks used in inflation. Secondly, the screw threads are fine pitch which require the sealing elastic to rotate many revolutions against the stem end during installation of the indicating device. This rotation may shear the elastic as it contacts the tire inflation stem—thus, potentially degrading the elastic seal.

During maintenance inflations of the tire, the indicating device will be removed and reinstalled, additionally shearing the elastic seal. If the elastic seal takes a set (non-elastic deformation, creep, etc.) during use, the proper action is to discard the removed device and replace it with a new device. Re-use of an old device in this case could result in significant leaking resulting from re-orientation of set material with respect to stem non-uniformities. Finally, in the objectionable devices, tire interior pressure exerts an opening force on the seal.

Requires Modification of Other Vehicle Products for Use

A fourth objection to the prior art is their means of being installed onto the tire. In, for example U.S. Pat. No. 5,040,561 issued to Achterholt on Aug. 20, 1991 U.S. Pat. No. 4,177,671 to Ichihara et al. on Dec. 11, 1979, U.S. Pat. No. 4,695,823 issued Sep. 22, 1987 to Vernon, and other known prior art, a tire must be removed from its wheel in order to install a modified stem type tire gauging device. In other cases, U.S. Pat. No. 4,562,874 issued to Scheller on Jan. 7, 1986, for example, the wheel is modified to accept the gauge installation. U.S. Pat. No. 5,218,861 issued to Brown et al. on Mar. 27, 1991 is for a tire with a pressure sensor and transducer embedded under the tread.

Device Specification Incomplete and Unworkable

A final objection to the prior art pertains to U.S. Pat. No. 4,695,823 issued Sep. 22, 1987 to Vernon. Integration of pressure transducers of the type previously manufactured by Transensory Devices have proven to be very difficult to package so as to provide a means of both attaching electrical contacts and admitting pressure to the sensitive portion of the circuit. When normal integrated circuit bonding materials are used to attach a such a chip to even a flat IC package substrate there are significant strains introduced that affect the transducer and cause it to produce an erroneous pressure output signal. A chip with the integration layout shown in Vernon's FIG. 3, if attached to a cylindrical tire stem as suggested by Vernon's FIG. 4, could be shown by finite element analysis to encounter severe error producing strain such as to be unuseable as a tire pressure sensor. Vernon's patent is incomplete and does not answer how electrical leads, such as for battery power and antenna connections, may be connected to the chip. Extremely fine gold or aluminum wires are typically bonded to microscopic pads on an integrated circuit. Other than for the ring detail, customary integrated circuit manufacturing technique would be found to be impractical or impossible for construction of pressure sensors in the locations suggested by FIG. 4. Certain non-obvious modifications of the tire stem or IC construction or both are required to implement practical devices but were not disclosed by Vernon and were unknown prior to my present invention. The devices of my invention are practical and my specification does describe in detail how they may be manufactured and employed.

Prior Art Lacks Broad Market Potential

The design of all known prior art devices limits commercial market size. Each known device would require a substantially different product design for application on, for example, a bicycle tire versus heavy trucking or airplane tires. Many of the prior art devices are impractical to use in small tire applications due to their considerable size and weight compared to the dimensions of a bicycle tire. For prior art designs that could be adapted to the full range of pneumatic tire applications, it is not commercially feasible to do so. For all except valve cap devices which are prone to leak, this is particularly true because the product requires not only different products for specific application but also different tire, tubes, or wheels than current products for sale. Therefore, commercialization of prior art devices is relegated to minor market niches.

Summary of Prior Art Deficiencies

The above describes relevant prior art and classifies the deficiencies with each as examples of the number of unsuccessful attempts to solve the current problem. Significant commercialization and profitability of tire inflation alarming devices will require better technical performance and general application to broadest range of pneumatic tire use than possible with prior art. In all cases the approach of the prior art has taught away from the approach of my present invention. My invention will be shown to have overcome the significant technical problems and to meet the commercialization goal.

OBJECTS AND ADVANTAGES OF MINIATURE COMBINED VALVE/TRANSDUCER INVENTION

Accordingly, several objects and advantages of my invention are high precision in gauging tire pressure and alarming under inflation, reliable operation and reliable sealing of tire pressure. My miniature valve/pressure transducer invention has advantages in commercialization. It provides easily performed retrofit of the valve/transducer invention to the full range of existing vehicular tires, as well as retrofit into numerous non-tire applications. My valve/transducer features low cost of manufacture consistent with wide market potential.

There is a broad scope of new applications for combined valve and pressure signaling in retrofit markets. I also believe my valve/transducer invention will enable creation of new markets and design applications using smaller pressure transducers resulting from the miniature form-factor of my approach. Applications other than these are possible. With regard to tire pressure guaging, the primary application for my valve core/transducer invention, I anticipate that manufacture of a few pressure range variants will be sufficient to cover use on the broad class of pneumatic tires for trucking (light, medium, and heavy), commercial transportation from passenger cars, taxi's, buses, etc. through airplane, and private transportation including bicycles, scooters, motorcycles, and autos. Further objects and advantages of my invention will become apparent from consideration of the drawings and ensuing description.

DESCRIPTION OF DRAWING FIGURES

FIG. 1A through FIG. 1E are a perspective view of several vehicles with pneumatic tires indicating general locations for using my invention in tire and non-tire air valves. FIG. 1A through FIG. 1E show potential locations on trucks, aircraft, motorcycles, autos, and buses, respectively. FIG. 1F is a perspective view showing a potential to use my invention in air spring shock absorbers as well as tires.

FIG. 2A through 2C show prior art. FIG. 2A provides cross sections of a typical prior art non-gauging valve core within a stem FIG. 2B shows a prior art modification to the valve stem. FIG. 2C shows a prior art non-gauging aircraft tire valve.

Figure 5A:
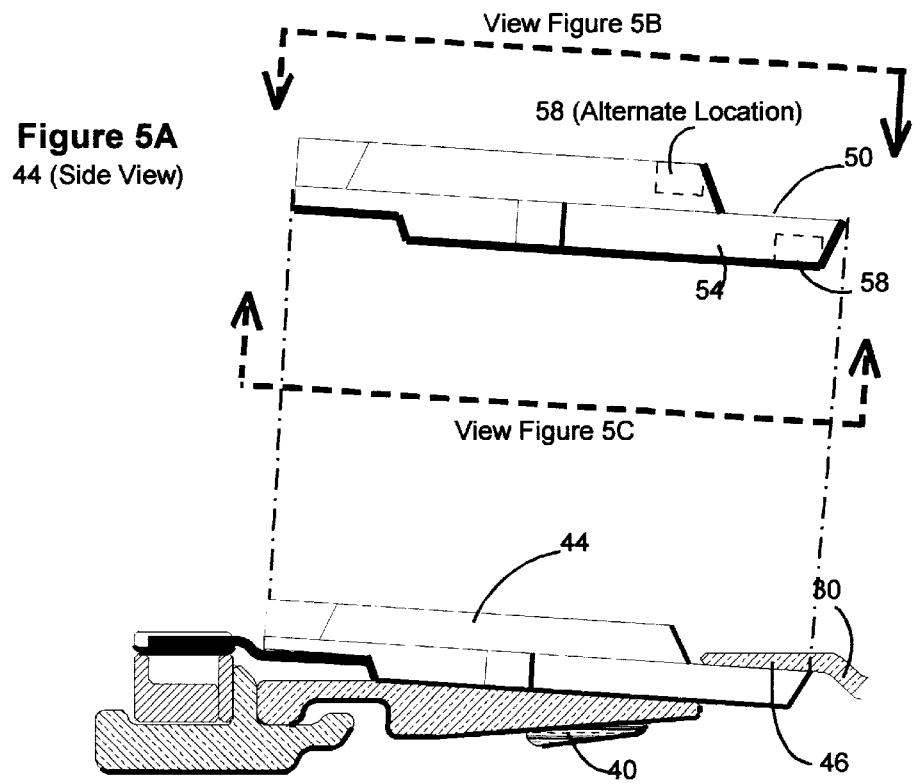
FIGS. 5A, 5B and 5C are drawings of three views (side, top, and bottom, respectively) of my invention's pressure signal processing integrated circuit.

FIG. 5A additionally shows, in cross section, the integrated circuit mounting portion of the valve core.

Figure 6:
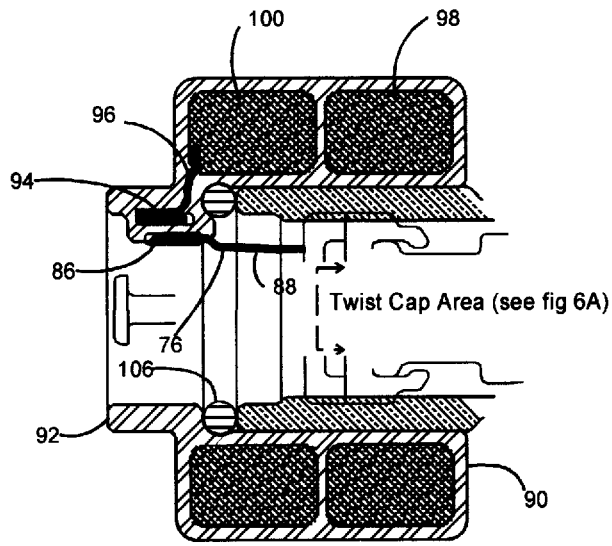

FIG. 6 is a cross section view of my invention's wireless communication device.

Figure 6A:
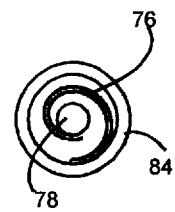

FIG. 6A is an axial view of my invention's twist capsule arrangement for connecting between the integrated circuit and the wireless communication device.

Figure 7:
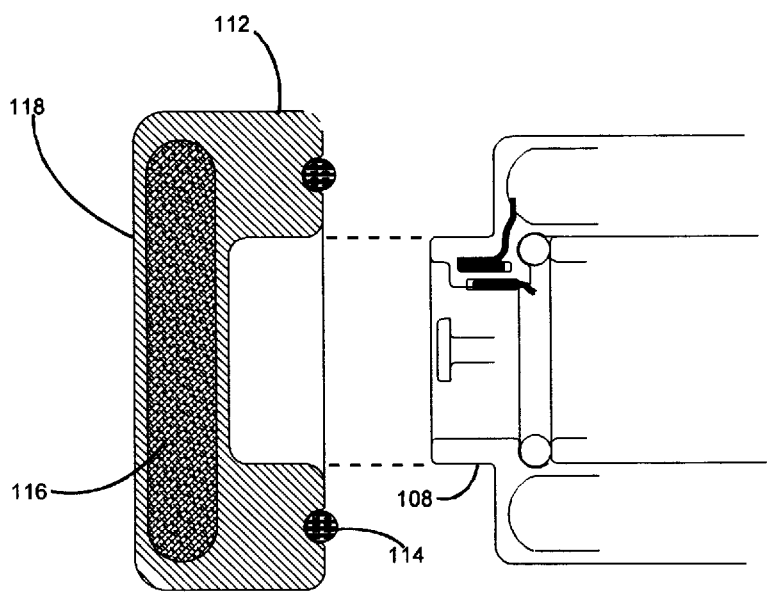

FIG. 7 is a cross section view of my invention's energizing device and valve stem cap.

Figure 8A:
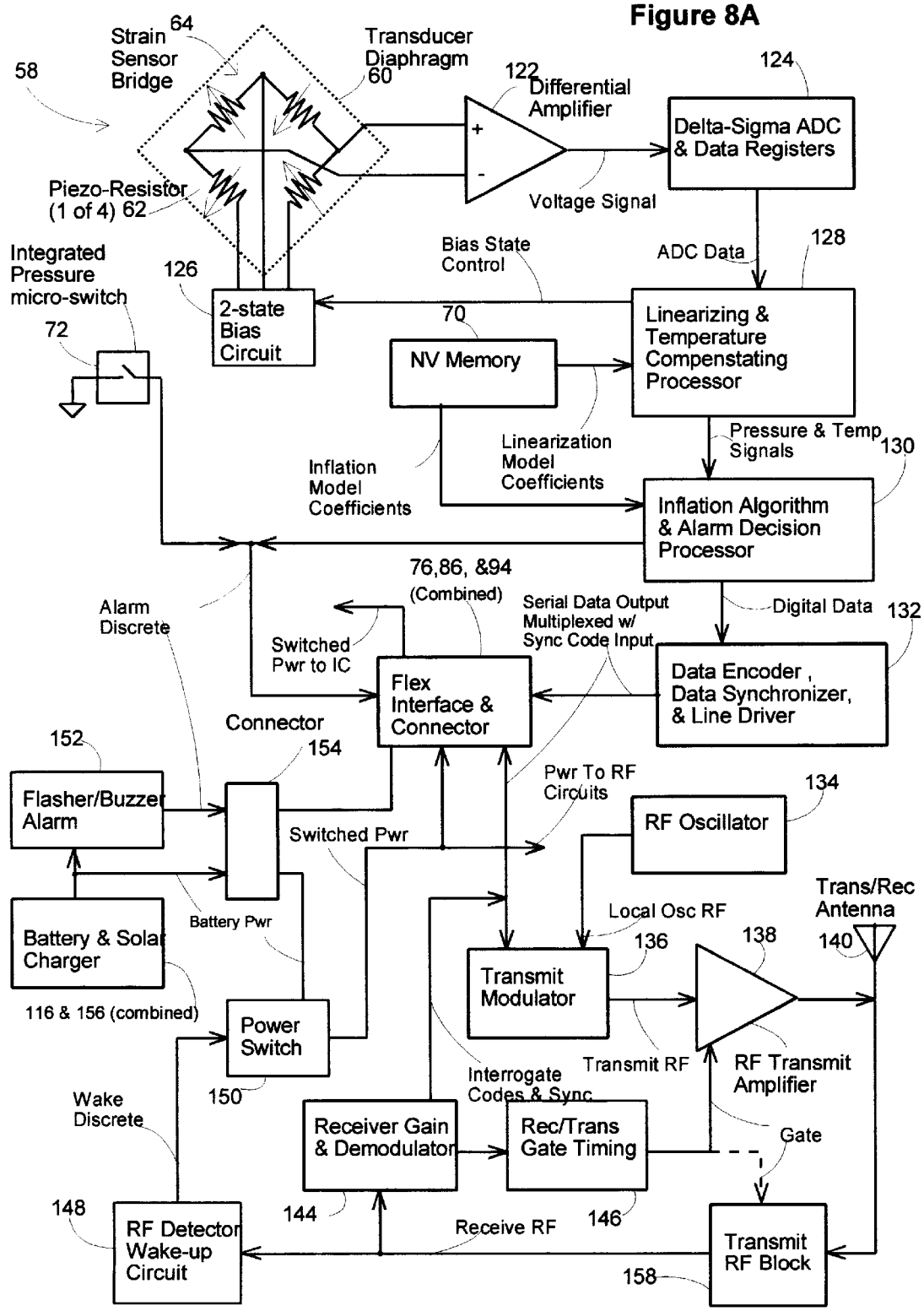

FIG. 8A is a block diagram of my invention's tire mounted electronic circuits.

FIGS. 10A and 10B show embodiments with optical sensing mechanisms in integrated circuits. FIG. 10A shows a mounting similar to FIG. 5A. FIG. 10B details an alternative mounting in a hollow cup. FIG. 10C through 10E are an outline drawing, a cross section drawing, and an exploded view drawing, respectively, of an alternate means of mounting an integrated circuit in a valve core.

Reference Numerals on Drawings

| | | | |
|---|---|---|---|
| 20 | Inflating Stem (Reference) | 22 | Valve Core (prior art) |
| 24 | Pressure Signalling Valve Core | 26 | RF Transponder & Stem Extender |
| 28 | Stem Cap with Battery | 30 | Valve Core Barrel |
| 32 | Valve Closure Cup | 34 | Valve Activating Pin |
| 36 | Valve Cup Seal | 38 | Valve Closure Spring |
| 40 | Valve Barrel Seat Seal | 42 | Exterior Thread Valve Seating Nut |
| 44 | Pressure Signal Processor Integrated Circuit | 46 | Barrel Indentation Exterior Mounting Seat |
| 48 | Barrel Interior Mounting Seat | 50 | IC Exterior Seal Area |
| 52 | IC interior Seal & Mounting Area | 54 | IC Annular Seal Area |
| 56 | IC Mounting & Sealing Adhesive | 58 | Integrated Pressure Transducer |
| 60 | Transducer Diaphragm | 62 | Pressure Responding Piezo-Resistors |
| 64 | Piezo-Resistor Bridge Circuit | 68 | Analog Conditioning and Interface Circuit |
| 68 | Integrated Signal Processor/Encoder | 70 | Integrated EEPROM |
| 72 | Integrated Pressure Micro-Switch | 74 | IC Interconnect Bond Area |
| 76 | Interconnecting Flex Circuit | 78 | Actuating Pin Guide |
| 80 | Actuating Pin Clearance Groove | 82 | Inner Flex Retainer |
| 84 | Outer Flex Retainer | 86 | Snap-Lock Connector Mating Half |
| 88 | Flex Retainer Clip | 90 | Transponder Housing |
| 92 | Transponder Extension Barrel | 94 | Snap-Lock Connector Mating Half |
| 96 | Printed Circuit Assembly | 98 | RF Transponder Antenna Assembly |
| 100 | RF Transmitter Receiver Assembly | 102 | RF Wake-up Circuit |
| 104 | Battery Connector | 106 | Stem Extension Seal O-Ring |
| 108 | Stem Extension Exterior Thread | 110 | |
| 112 | Stem Cap Housing | 114 | Cap Seal O-Ring |
| 116 | Battery | 118 | Piezo-Electric Buzzer Alarm |
| 120 | Hand-Held Remote Processor/Display Assy | 122 | Differential Amplifier |
| 124 | Delta-Sigma Analog/Digital Converter | 126 | Bridge Bias Circuit |
| 128 | Temperature Compensation Circuit | 130 | Inflation Model & Limit Processor |
| 132 | Sync Decoder/Signal Encoder Circuit | 134 | RF Oscillator |
| 136 | Transmit Data Modulator | 138 | RFAmplifier/Transmitter Circuit |
| 140 | RF Antenna | 142 | Receive/Transmit Antenna Multiplexer |
| 144 | Receiver Amp/Demodulator Circuit | 146 | Receive/Transmit Gate Circuit |
| 148 | Tuned Filter/Rectifier Wake-up Circuit | 150 | Wake-up/Sleep Power Switch |
| 152 | Piezo-Buzzer/Flasher Alarm Driver | 154 | Cap/Transponder Connector |
| 156 | Solar-Electric Battery Recharger | 158 | |
| 160 | Vehicle Installed Chassis Subsystem | 162 | Control and Display Microprocessor |
| 164 | Transmit/Receive Interface Channel | 166 | Wheel Well Mounted Printed Antenna(s) |
| 168 | RF Oscillator | 170 | Transmit Data Modulator Circuit |
| 172 | RF Amplifier | 174 | Receive/Transmit Gate Timing Circuit |
| 176 | Transmit RF Blocking Circuit | 178 | Receiver Gain & Demodulator |
| 180 | Shift Register/Channel Code Generator | 182 | System Display Unit |
| 184 | System Controls | 186 | Vehicle Integration Input/Output Circuit |
| 188 | Multi-Tire Load Evaluation Algorithm | 190 | Tire Parameter & Pressure History Memory |
| 192 | Tire Accumulated Miles Calculation | 194 | Condition Display Selection Logic |
| 196 | Fiber Optic Pressure Signalling Device | 198 | Optically Resonated Pressure/Temp Sensor |
| 200 | Fiber Optic Flex Interface | 202 | Valve Cup Mounted Pressure Sensor |
| 204 | Micro-machined Pressure Die | 206 | Hollow-Pin Valve Actuator |
| 208 | Interface Wiring | 210 | Protective Cover |
| 212 | Silicon Gel Encapsulation | 214 | Surface Acoustic Wave Transducer |
| 216 | SAW Reciever/Antenna Assembly | 218 | Pressure Sensitive Switch |
| 220 | Flex Wrap Assembly | 222 | Anti-Rotation Shearable Adhesive Bead |
| 224 | Two-part Weldable Barrel Assembly | 226 | Pressure Die Mounting Pedestal |
| 228 | Pressure Sampling Hole | 230 | Barrel Top Assembly |
| 232 | Ceramic Feed-Thru Circuit | 234 | Flex Circuit Assy |
| 236 | | 238 | |
| 240 | MEMS Gyro Structure | 242 | |

Figure 8B:
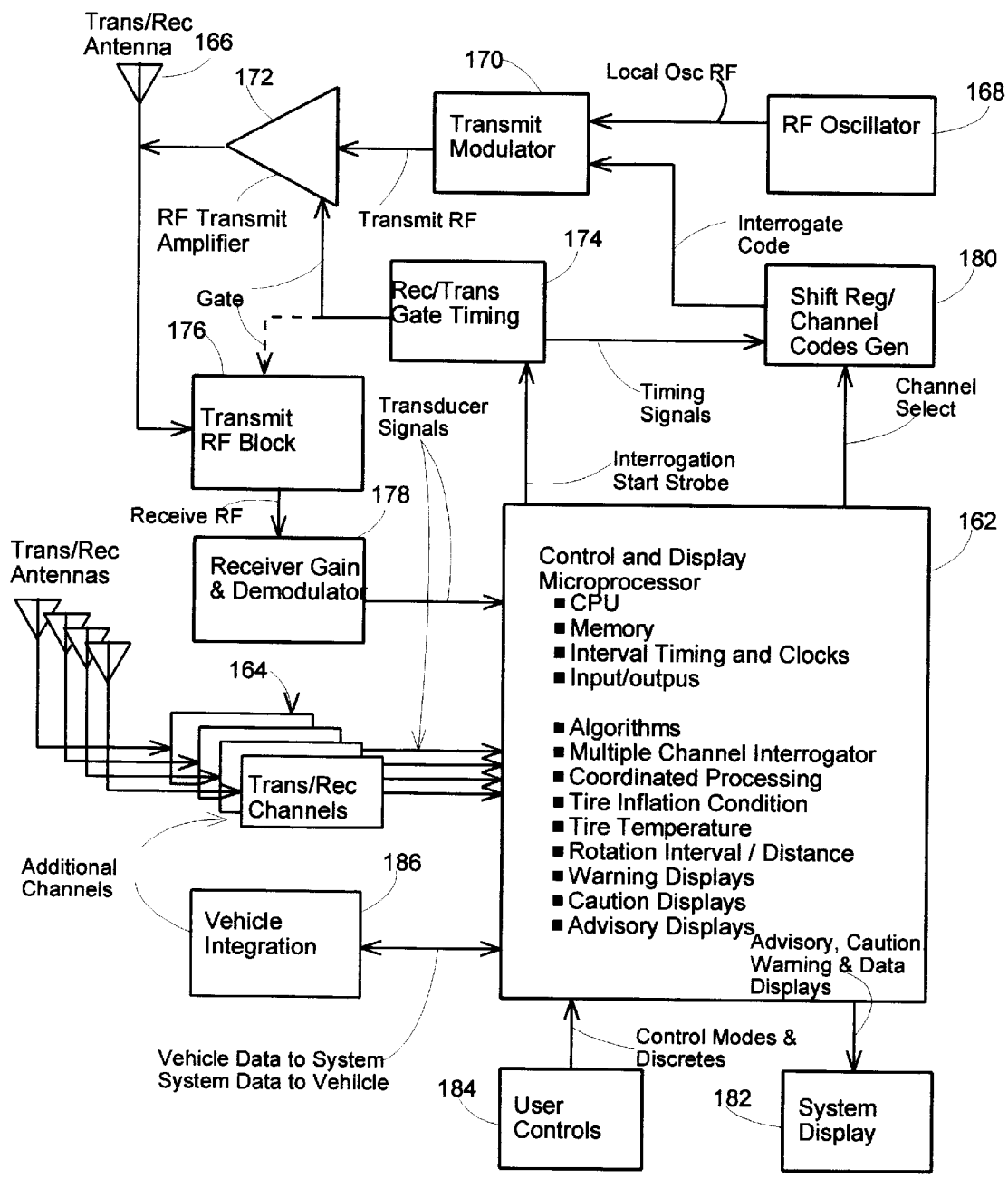

FIG. 8B is a block diagram of my invention's remote electronic circuits.

Figure 9:
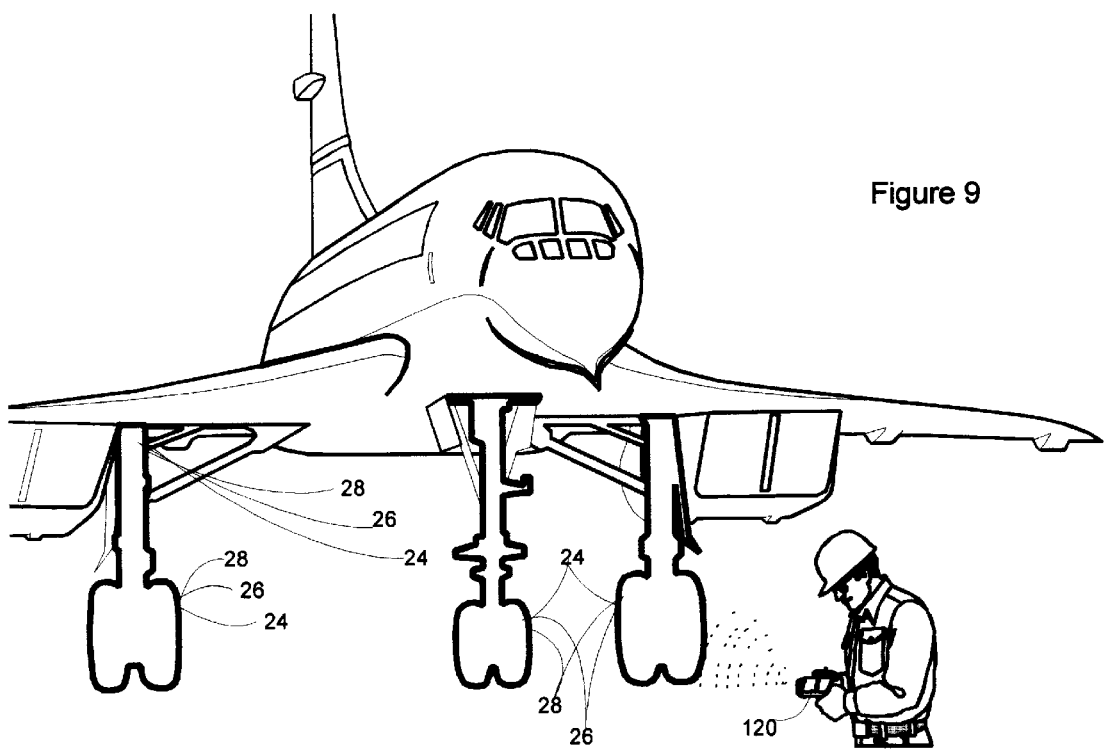

FIG. 9 is a perspective view of one means of operating the apparatus of my invention.

FIGS. 10A through 10E are drawings indicating alternative embodiments of my invention. Several are shown, but they should not be considered comprehensive.

SUMMARY OF INVENTION

Briefly my invention is comprised of a valve/transducer and system for pressure measuring. In it the valve/transducer is an appropriately dimensioned tapered barrel of rigid material with a gasket near the barrel's larger diameter and with a closable valve opening. My invention uses a pressure transducer combined with an integrated processor and interface. This combined transducer and processor is an integrated silicon circuit contained within the tapered barrel. My invention further includes wireless transmitter/receiver paired circuits and an indicator with novel displays of useful tire inflation and maintenance parameters.

STRUCTURAL DESCRIPTION OF THE INVENTION

FIGS. 1A–1F

The figures show a range of vehicles and indicates general locations on vehicles for applying my invention, a miniature combined valve and pressure signal generator or pressure signaling valve core 24 and an apparatus or system for use. Valve core 24 installs in vehicle pneumatic tires, shock absorbing components, and refrigeration components as indicated in FIGS. 1A–1F. A system for use consists of several component parts, namely an RF transponder or wireless communicating device 26, a stem cap with battery or energy source 28, (each used in multiples according to number of valve cores 24 used) and a vehicle installed apparatus or chassis subsystem 160. An alternate form for a system consists of a hand-held interrogator or remote processor/display assembly 120 (not shown in FIG. 1) and the remaining components used in multiples; transponder 26, cap 28, and valve core 24. The vehicles to which my invention applies include private, commercial, and military for pneumatic tires. There are non-tire related applications on the same vehicles.

FIGS. 2A, 2B and 2C

These figures show prior art. FIG. 2A shows in cross section detail the interior bore constraint as defined in Tire and Rim Association, Inc. (Copley, Ohio, USA) specifications for Standard Bore Core Chamber No. 1 and Standard Valve Core TR C1. FIG. 2B shows a prior art modification of the tire stem for pressure indication while retaining the valve core unchanged. FIG. 2C shows detail from an aircraft tire valve specification. The several valve arrangements shown constrain the form, fit, and function of my invention. With respect to the application there is an inflating stem or pressure introducing tube 20 which will be used in reference in following figures describing the configuration of my invention. Installed in stem 20 is a prior-art valve core 22 and covered with a prior-art stem cap not shown. Retrofit of my invention is simply accomplished by removing prior art stem caps and prior art valve cores 22 and replacing them with valve cores 24, transponders 26, and caps 28 shown in detail in FIG. 3. It helps to understand the nature of my invention by noting the similarity of form of prior art valve cores 22, 22', 22', and 22" independent of the specifics of their application. In contrast, note the variability of the external form of reference stems 20, 20', 20", and 20'" depending on the specifics of their application.

Figure 1A:
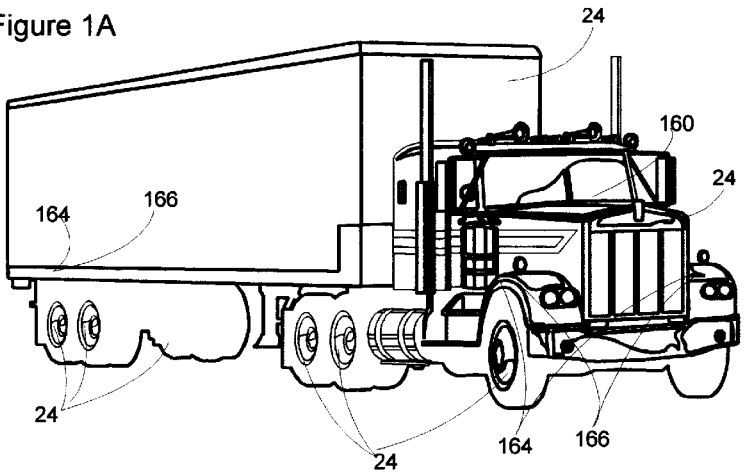
Figure 1B:
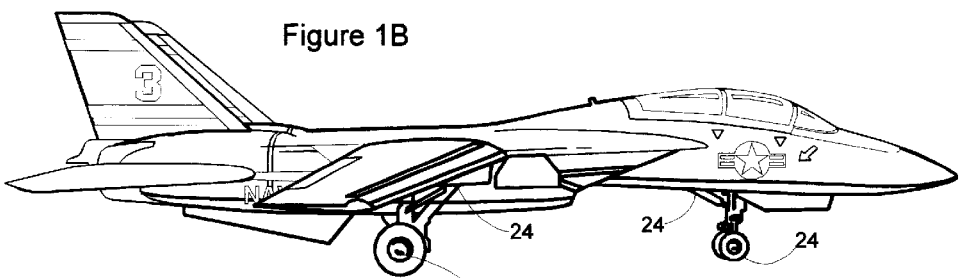
Figure 1C:
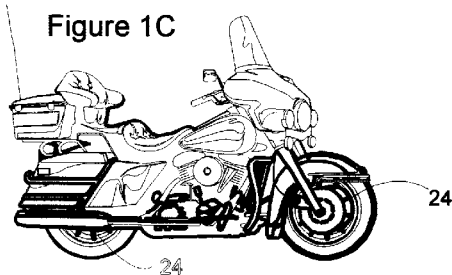
Figure 1D:
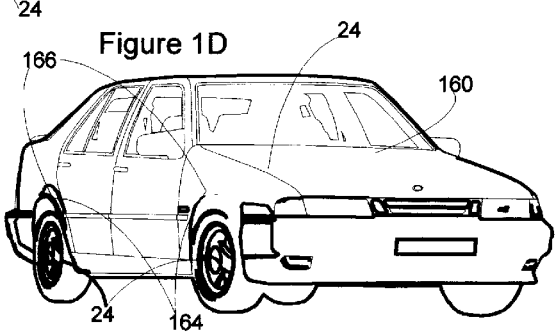
Figure 1E:
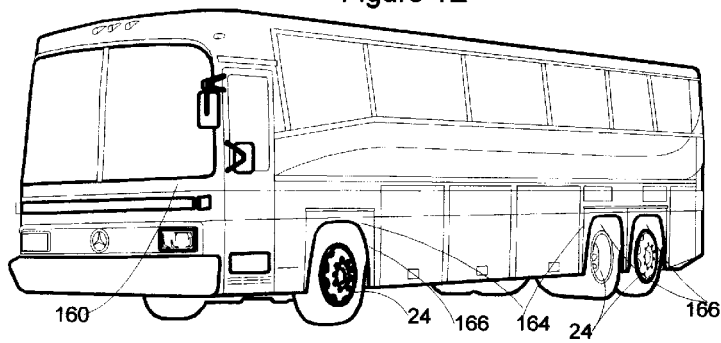
Figure 1F:
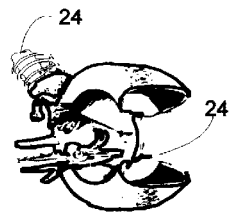
Figure 3:
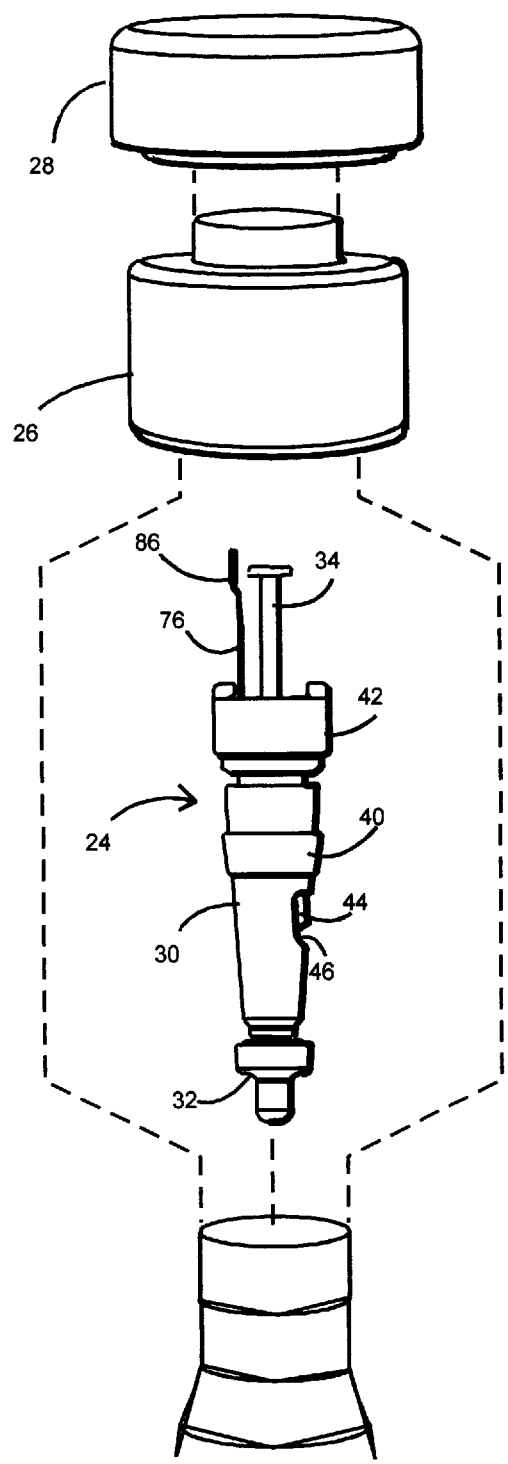
FIG. 3 is exploded view of installation of the preferred embodiment of my invention in the reference stem of FIG. 2.
Figure 4:
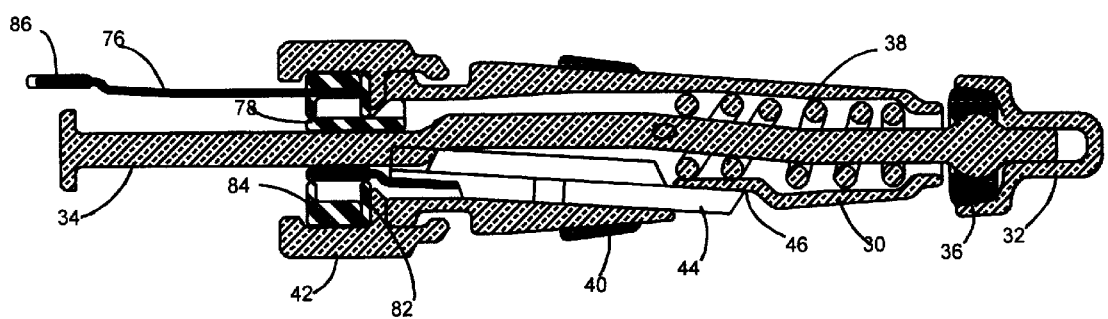
FIG. 4 is cross section view of my invention's pressure signaling valve core device.
Figure 5B:
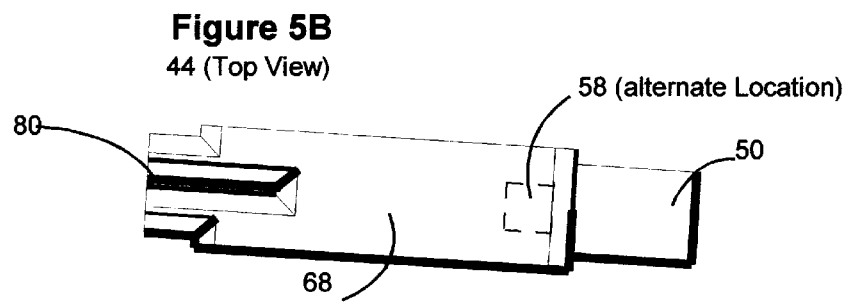
Figure 5C:
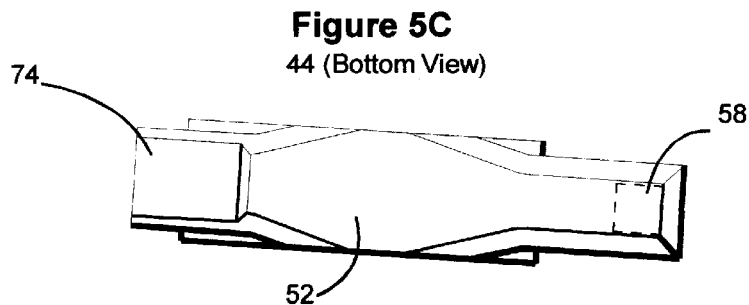

FIGS. 3 through 5

FIG. 3's exploded view shows the relationship between valve core 24, transponder 26, and cap 28 in relation to each other and reference stem 20. When installed in stem 20, valve core 24 is positioned such that gasket 40 compresses against an interior smooth bore drilling of stem 20 by an engagement of exterior threads of nut 42 with an interior thread of stem 20. transponder 26 installs to an outside threaded surface of stem 20 and electrically connects to core 24 as shown in FIG. 6. Cap 28 installs over transponder 26 employing the features shown in FIGS. 6 and 7 for their physical and electrical interconnection. In the following descriptions, I use the following terms and definitions to orient and clarify descriptions:

proximal and distal ends of items, points or locations; in this context the reference viewpoint will be from an outside of cap 28 (at left in FIG. 3) along a central axis of stem 20's drilled interior toward its right hand side on FIG. 3. Proximal is relatively nearer cap 28 and distal is relatively farther from cap 28, and inside or interior and outside or exterior of hollowed components; in this context the inside/outside reference will be to the item itself—hence, it is possible for the outside surface of a part to face or contact the inside surface of another part.

Visible in FIG. 3 are the following components of valve core 24: a valve core barrel 30, a valve closure cup 32, a valve activating pin or push rod 34, a valve barrel seat seal or gasket 40, an exterior threaded valve seating nut or exterior threaded ring 42, a distal end of a pressure signal processor integrated circuit, IC dice, pressure probe, or micro-machined pressure chip 44, a barrel indentation exterior mounting seat or pressure probe seal depression 46, a proximal end of a flex circuit or electrical interconnecting assembly 76, and a flex connector or one-half of a mating pair snap lock connector 86. These components are shown in FIG. 4 in cross section and IC 44 is also shown in FIG. 5A cross section and FIG. 5B and 5C plan views.

FIG. 4 shows a physical connection (typically metal crimping) of pin 34 into cup 32 also containing a valve cup seal, o-ring, or gasket 36. Seal 36 is compressed against a distal end surface of barrel 30 by a valve closure spring or coil spring 38. A distal end of spring 38 bears against an inside distal surface of barrel 30. An opposite or proximal end of spring 38 is attached to pin 34 near an approximate midpoint of pin 34.

Figure 4A:
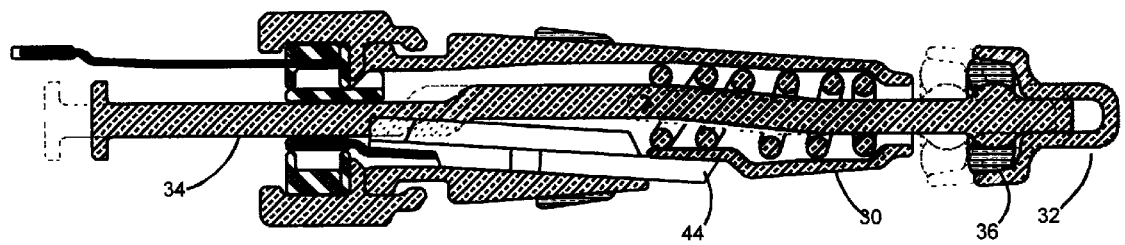
FIG. 4A is cross section view of my invention's pressure signaling valve core device showing operation of the moveable parts.

FIG. 4A shows operation of the valve showing spring 38 in compression by force applied to pin 34. This opens the valve by moving cup 32 and seal 36 distally away from the mating surface of barrel 30.

Also referring to FIG. 4, IC 44 mounts on a flattened inside surface, formed mounting seat, or mounting floor 48 in barrel 30 attaching by means of an adhesive, epoxy, eutectic bond, or mounting and sealing compound 56 in adhesion with mounting floor 48 and a proximal bottom-side area or seal/mount planar surface 52 of IC 44. (see FIG. 5C) IC 44 further extends in a distal direction projecting through a hole onto indentation 46 where it is attached by adhesive 56 between indentation 46 and a top-side planar surface or seal area of IC 44. Adhesive 56 also fills an annular gap between barrel 30 and IC 44 adhering to both barrel 30 and an annular seal area of IC 44. When assembled as described, IC 44, adhesive 56, barrel 30, cup 32, seal 36, gasket 40, and a previously mentioned inside surface of stem 20 form a continuous solid barrier—leak resistant to an operational high pressure difference between barrel 30 inside and barrel 30 outside surfaces distal to gasket 40.

IC 44 contains an integrated micro-machined pressure transducer 58 consisting of a flexible diaphragm 60 combined with a pressure reference cavity 60'. A set of four piezo-resistors 62 are constructed during IC 44 fabrication within areas of flexure strain on transducer diaphragm 60. Piezo-resistors 62 are interconnected to form a sensitive bridge circuit 64 which provides an electrical signal approximately proportionally responsive to a difference in pressure applied to diaphragm 60 outside surface with respect to cavity 60'. IC 44 further contains integrated analog circuits 66 and digital electronic circuits or processor/encoder circuits 68 electrically connected to piezo-resistors 62. IC 44 further contains an integrated digital memory circuit or EEPROM 70, and an integrated encoder processor circuit/ encoder 68. Piezo-resistors 62, analog interface 66, processor/encoder 68, EEPROM 70 are constructed and interconnected during IC 44 fabrication. Their interconnection and functional purpose is as shown in FIG. 8 electronic block diagram. Processor/encoder 68 connects to an arrangement of electrical signal bonding pads or IC interconnecting pads or flip-chip interconnects or Ball-Grid-Array (BGA) solder bumps 74. BGA bond pads 74 assembles and electrically connects to a distal end of flex circuit 76 which has a mating pattern of electrical conductors.

Flex circuit 76, providing electrical interface between IC 44 and remaining components of a system, exits a proximal end opening in barrel 30. Flex circuit 76 attaches to an actuating pin guide or plastic supporting spline 78 and coils around guide 78 and proximally exits core 24 though a center opening in nut 42. Guide 78 has an axial hole of non-circular cross section and matching a non-circular (possibly square) cross section of pin 34 which passes through guide 78. At a distal end of guide 78, it has exterior splines of shape and size matching barrel 30's proximal opening. Exterior splines of guide 78 taper to a smaller diameter near a proximal end of guide 78 where guide 78 enters a hole in an inner flex retainer 82. A coil wrapping of flex circuit 76, supported by guide 78 on an inner radius and supported by an outer flex retainer 84 on an outer radius is contained within a cylindrical box formed by guide 78, retainer 82, and retainer 84. Retainer 82 with attached flex circuit 76 is free to rotate approximately one turn clockwise and one turn counter-clockwise with respect to guide 78 thereby forming a twist capsule or rotationally coupled electrical interconnecting assembly with flex circuit 76.

Final structural description of core 24 identifies that pin 34 is patterned with a series of bends in a plane beginning on a distal side of guide 78. Bends in pin 34 allow pin 34 and spring 38 to clear an inner surface of barrel 30 and IC 44. As necessary IC 44 will contain a pin clearance groove 80 proximally located on its top surface. IC 44 will also contain a microstructure pressure switch 72, normally open with pressure above a first predetermined pressure value. Switch 72 closes with pressure below a 2nd predetermined pressure value.

Nut 42 is positioned over barrel 30 during assembly of flex circuit 76 and retainers 82 and 84 and retained by rolling a distal edge of nut 42 into a circumferential groove in barrel 30. Retainers 82 and 84 have spoked wheel appearance which are primarily open to allow air to pass through them. All parts described are capable of very economical mass production using, for example; metal stamping or forging for barrel 30, cup 32, pin 34, and nut 42; plastic injection molding for guide 78, and retainers 82 and 84; printed circuit fabrication for flex circuit 76; anisotropic etching of bulk silicon and anodic bonding of multiple wafers for constructing the form of IC 44, transducer 58, reference cavity 60', micro-switch 72, and/or pressure ducting channels interior to IC 44 as required; conventional integrated circuit fabrication (for example CMOS fabrication processes) for epitaxial growth, patterning, etching, diffusing, oxidizing, and metalizing to construct integrated circuit elements for analog interface 66, processor/encoder 68, EEPROM 70, and bond pads 74. Electrical assembly is simple requiring BGA attachment of flex circuit 76 to IC 44 prior to installation of the assembly into barrel 30. Wire bonding at the level of assembly of core 24 or barrel 30 with IC 44, which would require non-traditional manufacturing equipment/process, is avoided in this embodiment of my invention. Other manufacturing procedures are possible for the fabrication of core 24 and/or its component parts.

The dimensions of core 24 are approximately 27 mm in length from end of cup 32 to end of pin 34 and 4.3 mm diameter at gasket 40 tapering to 2.4 mm at the smallest diameter of barrel 30. Said diameters are consistent with Tire and Rim Association, Inc. (Copley, Ohio, USA) specifications for Standard Bore Core Chamber No. 1 and Standard Valve Core TR C1. IC 44 measures approximately 12 mm in length by 2.5 mm in width by 2 mm in height. Flex circuit 76 has 4 printed conductors each approximately equivalent to 40 AWG wire and measures less than 0.2 mm in thickness, 1.2 mm in width, and total equivalent length of approximately 38 mm. Transducer 58 diaphragm and piezo-resistors 62, in combination, are less than 1 mm square. Area for integration of analog circuit 66, processor/encoder 68, and EEPROM 70 is approximately 4 mm by 2 mm. Transponder 26 is approximately 17.5 mm in diameter by 13.5 mm in length. Cap 28 is approximately 19 mm in diameter by 8 to 16 mm in length.

FIGS. 3, 6, and 7

FIG. 3 shows RF transponder 26 which has a transmitter/ receiver assembly, RF circuit assembly, or printed wiring assembly 96 shown in cross section in FIG. 6. Circuit 96 is connected to a miniature RF antenna, printed antenna, or high frequency coil 98 and to a second mating connector half 94 of a connector mating pair. Circuit 96, antenna 98 and connector 94 fit within a stem extender housing, transponder external housing or tubular electronic case 90. Interior to housing 90, circuit 96, and antenna 98 is a second tubular barrel 92 which is threaded on its interior at a distal end with threads mating with proximal exterior threads of stem 20. An O-ring or moisture seal 106 fits within an internal annular interface of barrel 92 such that when transponder 26 is installed upon stem 20, O-ring 106 seals the assembly of 20 and transponder 26 from moisture penetration through their mated threaded interface. Interior threads of transponder 26 will have integral torque locking provisions or be used with thread locking adhesive to prevent accidental backoff from torques applied to cap 28.

When transponder 26 is tightly mated to stem 20, the extended length provided by barrel 92 matches a proximal extension of pin 34 such that the relative positioning of a button formed on pin 34's proximal end with respect to barrel 92's proximal opening matches the relative positioning of a similar pin of prior art valve core 22 with respect to stem 20's proximal opening. An exposed proximal end of barrel 92 has an exterior and interior diameter and exterior threads matching stem 20's diameters and threads. Distal to barrel 92's exterior threaded extension, barrel 92 is penetrated by a hole through which connector 94 connects with circuit 96. Connector 94 attaches to an inside arc segment of barrel 92. After transponder 26 is threaded onto stem 20, connectors 86 and connector 94 are mated electrically and retained in mating position by a snap-fit retention design of their mating interfaces. FIG. 3 shows cap 28 in relative position to transponder 26. FIG. 7, cross section, shows cap 28 as a double wall closed cap with an interior thread. Cap 28's interior thread matches exterior threads of transponder 26. Between case walls of cap 28 there is a battery 116 and a quartz vibrator disc or piezo-electric buzzer 118. Near an outer circumference of a distal disc surface of cap 28 is an O-ring 114. O-ring 114 seals the assembly of cap 28 and transponder 26 from moisture intrusion at the interface plane between transponder 26 and cap 28. An electrical interconnection between transponder 26 and cap 28 is provided by electrical conductor circuit traces and wiping contacts on the mating surfaces of transponder 26 and cap 28 inside O-ring 114's circumference. Electrical contacts are not shown but each contact pair can be similar in form to a printed variable resistor and center tapping slide.

Description of System Components

A hand held remote RF transmitter/receiver 120, as shown in FIG. 9, is one embodiment of a device for interrogating and displaying the pressure indicating signals and other data produced by core 24 assembled with transponder 26 and cap 28. For most vehicular applications however, a system of components mounted on the vehicle is preferred. An apparatus or chassis subsystem 160, as indicated in FIG. 1, consists of a set of printed circuit antennae 166 mounted in a vehicle wheel well near the tire(s) with attached core 24. Each antenna 166 is connected to an RF channel circuit module 164. The size, shape, and weight of channel modules 164 and antenna(e) 166 are not of significance as long as the equipment functions in accordance with requirements identified in FIG. 8, electronic block diagram. A plurality of antennae 166 and channel modules 164 are interconnected via a conventional interconnect wiring assembly or electrical cable, not shown, to an electronic assembly with control/display 162 mounted in the vehicle in a position viewable and operable by the vehicle driver. Physical configuration of module 164 is of little importance except that it be esthetically pleasing and ergonomically suitable to its purpose as detailed in FIG. 8. Control/display 162, module(s) 164, and antenna(e) 166 together are chassis subsystem 160. They are manufacturable using conventional or high density electronic assembly design and construction methods, such as printed wiring boards, hybrid or multi-chip-module, application specific integrated circuits, field programmable gate arrays, discrete electronic componentry, liquid crystal display, LED display devices, and wired cable assemblies and combinations of these methods and others not mentioned.

Block Diagram

FIG. 8 shows the electronic elements of my valve/transponder invention and system. It presents a lower level of functional detail than described in the earlier mechanically oriented paragraphs. The functional relationships and features of the electronic elements identifies novel signal processing features of my invention. These enable a wide range of potentially useful displays and indica from the system. The operational description paragraphs present some of the potential output indica. However, many more are possible with the electronic functions (and their natural extensions) shown in the following paragraphs.

A set of signals consisting of electrical power, control signals, and data signals (one such data signal being a conditioned pressure signal) provide interface between IC 44 and remaining components of the system. As previously shown, IC 44 consists of transducer 58, analog interface 66, processor/encoder 68, EEPROM 70, and interconnecting circuitry. FIG. 8a provides additional functional details of these elements. Transducer 58 consists of diaphragm 60, piezo-resistors 62 connected in a five-terminal bridge circuit 64 as shown. Bridge 64 connects to both a current source bias circuit 126 (which is operated in two bias states) and to a differential amplifier 122. Bias circuit 126 and amplifier 122 are part of analog interface 66 as is an over-sampled delta-sigma analog/digital converter (ADC) 124. Serial digital signals from ADC 124 connects to a linearizing and temperature compensating processor or calibrator 128. Calibrator 128 controls the bias mode of bias circuit 126. According to which of the two bias states is selected, ADC 124's output will represent either a first digital signal or a second digital signal. The first digital signal will be more sensitive to strain produced variation of piezo-resistance in bridge 64 than in temperature induced variation. Conversely, the second digital signal will be more sensitive to temperature than to strain. From the first and second digital signals, calibrator 128 produces compensated pressure and temperature digital data using a set of mathematical model coefficients from EEPROM 70.

Note: Physically, calibrator 128 can be realized by means of a conventional arithmatic logic unit (ALU), a conventional digital state controller, and a control program. Together these items comprise IC 44's processor/encoder 68. I have chosen to use a functional rather than a physical description of IC 44's processor/encoder 68. I believe the functional description is the better explanation of my invention. Inflation/alarm processing and data encoding will also be performed as sequential operations by the physical logic used by calibrator 128.

Processor/encoder 68 operates on compensated pressure and temperature data via an inflation model processor to determine a binary value (true or false) for a tire inflation condition alarm. The inflation/alarm processor provides model outputs to a data encoding process which serializes model output data for transmission to remote units 120 or chassis subsystem 160. Flex circuit 76 and connectors 86 and 94, shown combined as a single block, provide electrical interconnection to RF transponder 26. Serial output data encoding is Manchester or bi-phase encoding which is self clocking. Serial data flow is bi-directional on a conductor pair in flex circuit 76. Processor/encoder 68 outputs encoded data only within a predefined gate (time window) synchronized with a timing protocol synchronized to signals transferred from transponder 26 circuits.

Micromachined micro-switch 68's output wire-or connects with inflation/alarm processor 128's binary signal. This signal interconnects to an alarm circuit (piezo-buzzer of LED flasher) 152 in cap 28 through a conductor in flex circuit 76.

RF transponder 26 consists of RF transmission and receiving circuits as shown. The circuits required for transmission of encoded transducer outputs of valve core 24 include an RF local oscillator 134, a modulator circuit 136, an RF "power" amplifier 138, and an antenna 140. Circuits required for reception include an RF power blocking circuit 146 and a receiver/demodulator circuit 144. RF block 146 prevents "high power" transmit signals from being introduced into receiver/demodulator 144. It is realizeable as a pin diode switch (i.e., for use with transmit/receive using single frequency band) or as a band-pass filter (i.e., duplex type interface using separate frequency bands for transmit/receive). A received and demodulated synchronizing pulse or code word drives a receiver/transmitter gate timing generator circuit 146. Gate circuit 146 controls the manchester interface timing protocol and enables RF amplifier 138 and RF block (switch) 146. RF Frequencies used by the transponder are the unlicensed RF bands.

Other control circuitry relates to a power reducing sleep mode of operation. A low $r_{ds}$ FET transistor switch 150 normally disconnects battery 156 from transponder 26 and valve core 24 circuits. This is a low battery drain sleep mode. An RF detector circuit detects in-band RF energy from antenna 140 when a remote unit (either hand-held unit 120 or from chassis subsystem 160) operates. A detected wake signal or binary discrete from detector 148 wakes up transponder 26 and valve core 24 circuits by switching transistor 150 ON. Thus, battery 156 is not drained when no remote unit 120 or chassis subsystem 160 is operating (i.e., the vehicle is not operating and is unattended).

Chassis Subsystem—FIG. 8B

FIG. 8B shows the components and electronic functions of chassis subsystem 160. The RF circuitry comprising a transmit/receive channel 164 is similar in function to transponder 26 circuitry. Multiple channels 164, one for each axle end or tire, will connect to a control and display microprocessor 162. RF channel 164 includes the following circuits: a printed antenna 166 for mounting in the vehicle's wheel well near a tire; an RF oscillator 168; an RF modulator 170; an RF transmitter amplifier 172; a gate generating circuit 174; an RF blocking circuit 176; and a receiver amplifier/demodulator 178. A channel code generator/shift register 182 outputs data for modulation on local oscillator RF and transmission. Control and display microprocessor 162 is a conventional microprocessor circuit with a memory, a CPU, input/output circuits, data and address busses, and timing/interrupt circuits. It interfaces with a user control panel 184 and a system display panel 182. These, too, are conventional, commercial type display and switch panels. Finally, an optional vehicle interface interface circuit 186 provides a means to integrate the system with existing vehicle displays and data sources.

OPERATION OF VALVE/TRANSDUCER AND SYSTEM

Mechanical Function

Air pressure from . . . 137.9 kpascal (20 psi) (e.g., low pressure recreational all-terrain vehicle) to 4137 kpascal (600 psi) (e.g., high pressure aircraft tire) is contained in fully inflated peunamatic tires. The tire, considered for this discussion a flexible pressure container, connects with an unclosed opening of stem 20 at its distal end. Valve core 24 as installed in stem 20 is a pressure barrier which can be opened or closed to add/release air from the container or seal the container and retain the internal pressure.

Inflation starts with cap 28 removed. Manual attachment of an air-hose chuck to the proximal end of housing 90 distally depresses pin 34 which displaces cup 32 and its seal 36. The displacement is sufficient to open a gap between seal 36 and barrel 30 which opens the valve so that the container receives air from the air-hose. Removal of the air-hose chuck releases pin 34. This permits spring force of spring 38 to displace cup 32 and seal 36 to their original closed position. Differential pressure between the distal side of cup 32 and the interior of barrel 30 also acts in a closing force on seal 36. Upon completing inflation, cap 28 is installed. This connects battery 116 to electronic circuits in core 24 and transponder 26 and encloses the low pressure region between the interior of barrel 30, proximally extending through barrel 92 to cap 28. The completed assembly of stem 20, transponder 26, and cap 28 form a continuous protective barrier between the assembly exterior environment and electrical connections, components, and circuits inside. Cap 28 also serves as replaceable energy source and it can be removed and replaced in the event of battery discharge, for example, without disturbing the installation of core 24 or transponder 26 or their electrical interconnection.

The exposed distal end of IC 44 communicates the tire interior pressure to diaphragm 60 of transducer 58. The pressure exerts a flexing force on diaphragm 60. The value of strain produced on diaphragm 60 is dependent on the equivalent spring rate of IC 44's silicon material and its thickness. Both parameters will be known with high precision—a result of the micro-machining process. Piezo-resistors 62 either increase or decrease their resistance in accordance with their specific location in transducer 58 and the value of strain at the resistor. However, piezo-resistors 62 will also change resistance in accordance with temperature. Electronic circuits of IC 44 are arranged to both compensate for this temperature dependence and to detect and amplify the small strain dependent resistance changes.

Electronic Functions

Bias circuit 126 connects to bridge 64 through three terminals as shown in FIG. 8A. The first bias mode is as follows—voltage bias is applied to the center terminal and outer terminals are either, shorted together and biased with a current source, or each separately biased with individual but matching and tracking current sources. In this bias mode, the voltage differential output by bridge 64 to amplifier 122 will predominantly be determined by strain produced on diaphragm 60 by the applied pressure. Temperature dependent error terms will add to the differential voltage and must be compensated.

In the second bias mode temperature variation of bridge piezo-resistors 62 will predominate the differential bridge output voltage. This bias mode separately biases the outer terminals with positive current on one terminal and a matching value, opposite polarity (negative) current on the other terminal. Strain dependent variation of piezo-resistors 62 values will effectively appear as a common mode voltage error from the bridge circuit 64's output. Calibrator 128 will compute products of the first (strain predominant) and second (temperature predominant) ADC signals with transducer mathematical model coefficients. It will apply these correction values to the uncorrected ADC signals to calibrate the pressure and temperature outputs of the system. Manufacturing tolerances of piezo-resistors 62 (e.g., up to 20% error in absolute resistance value from IC wafer to wafer, although resistance ratios will be precise—approximately 0.1% error) and other fabrication variables will be calibrated by specific model coefficients programed into EEPROM 70.

Further processing of tire inflation parameters involves involves correcting for the pressure temperature relation of gases in fixed volumes (only an approximation since the tire air container is flexible). As necessary, the processing will also correct for the variable stiffness of tire sidewall with pressure and temperature which is parameter that changes the container volume. Another is variation in elasticity of tire material with temperature. A temperature, pressure mathematical model of the desired specific tire models (or type) will be programmed into EEPROM 70. EEPROM 70 will also contain a serial number code which has additional utility when used with chassis subsystem 160.

Other embodiments of my valve/transducer invention will use the same processing algorithms described above but may use a different implementation of a digital ALU 68 or algorithm processor. In particular, these algorithms are suitable for computation in integrated transponder digital circuits (not shown) or in remote microprocessor 162.

The manchester serial data interface was previously described to be a bidirectional self-clocking protocol controlled by sync and timing signals originating in receiver circuits 144 and 146. A further refinement of the operational description of the reception/transmission process is needed. There will be operations involving multiple transponder 26 simultaneously receiving RF interrogating signals (e.g., multiple tires at an axle end and multiple axles in close proximity as is eighteen wheel tracker/trailer or aircraft landing gear). Such multiple reception can come with use of either hand-held assembly 120 or chassis subsystem 160. To provide robustness to system operation, additional protocol is implemented in receiver circuits 144 and 146 and in code generator 180. This protocol involves sequential selection of specific transponder transmission of data. Gate circuit 146 recognizes demodulated interrogation codes in transmissions from RF channel circuit 164 and responds to a selection match/mismatch of interrogation code with EEPROM 70 device serial numbers. If there gate circuit 146 detects a match it enables the transmit gate. Otherwise it leaves the transmit gate disabled.

Additional selectivity is provided in channel receiver 178 between potential overlapping transmissions from multiple transponders 26. Transmission of valve core 24 serial number also allows remote processing to unambiguously display the location on the vehicle of tires which require maintenance. For example, using chassis subsystem 160, it is possible to automatically detect a rotation of tires from one axle to another via the transmitted valve core serial number. This leads to a mechanization whereby the display microprocessor 162 generates an advisory message to that a recommended rotation interval is due or has been exceeded. Microprocessor 162 will also retain a non-volatile memory of tire pressure history (statistics) and estimate vehicle load increases or decreases using past statistics, recent pressure/temperature values, and current pressure/temperature values from all vehicle valve core 24 in tires and suspension components (i.e., gas pressurized shock absorbers, air cushion bladders, etc.). Cautionary display indica will include displays which inform vehicle operators to add air under higher weight loading. Warning indica will include unsafe tire pressure and/or tire operating temperature. Advisory indica will include displays which inform operators about "optimal" gas mileage operating conditions or "optimal" tire life operating conditions.

FIG. 9 shows a hand-held remote processing and display device 120 communicating via RF transmission and reception with my invention's combined valve core 24 and transponder 26 installed on a tire. Processing, functions, and electronic diagram are similar to those for chassis subsystem 160 with two minor exceptions. A single RF channel interface 164 is required. Vehicle integration input/output circuit 184 is not required or implementable. Other means of operating the apparatus are also possible. For example, in the case of use with a bicycle or motorcycle, a satisfactory mode of operation could eliminate RF transponder circuits. This mode could use a flashing LED and/or piezo-electric intermittent buzzer (i.e., a beep) in cap 28 to catch the attention of the vehicle rider.

Assembly/Installation Features

During installation of valve core 24 into stem 20, it is important that nut 42 rotate with respect to gasket 40. This avoids "screwing" gasket 40 into its final compressed location against stem 20's seat. Instead gasket 40 will axially translate into place and undergo only a relatively small displacement after initially contacting stem 20's seat. To allow the rotation of nut 42 with respect to the remainder of valve core 24 assembly, nut 42 has a clearance opening for flex 76 which extends proximally through nut 42. This is a slight modification in form from the seating nut of prior art valve core 20. The tool for torqueing nut 42 will be appropriately changed, but this is a minor issue.

After installation of transponder 26 onto stem 20 the position of connector 94 will be randomly oriented with respect to flex 76 and connector 86. Therefore, flex 76 must have sufficient service slack to adjust to any angular position of connector 94. Yet the service slack must not interfere with operation of pin 34 or extend into the proximal opening stem 20 where inflating chucks could crimp or pinch its electrical conductors or insulation. The twist capsule 76' formed in flex 76 by retainers 82 and 84 provides a means to manage the service slack. It allows rotation of flex 76 through more than a full turn which is adequate to position connector 86 properly with respect to connector 94. Rotation in the twist capsule keeps the proximal end of flex extended axially for proper alignment of mating connections of connectors 86 and 94.

DESCRIPTION OF OTHER EMBODIMENTS

I considered other embodiments of my valve/transducer and system invention. I chose the embodiment presented above because it partitioned functional elements to system components in a manner which is flexible for application and economical for production. This is somewhat indicated by the flexibility of application evident in above descriptions of both hand-held unit 120 and chassis subsystem 160, but the preferred embodiment does more. For example, using a digital serial interface between IC 44 and transponder 26 optimumized flexibility of implementing useful variants. Without modifying the design or manufacturing process of IC 44 and changing only transponder 26 to a non-RF variant, it is possible to easily apply my valve core invention to refrigeration systems which also use valve cores. In this case the non-RF "transponder" (not shown) will contain an electrical connector for interfacing transducer data (i.e., via wire harness) to a conceivable built-in-test circuit retrofitted elsewhere in the refrigeration system. In this case, electrical power can be provided by the external circuits. The cap for this variant will be a conventional dust cap. A refrigeration system as described here is an inexpensive retrofit onto existing systems which, by gauging coolant status during normal operation, can eliminate costly periodic coolant service checks.

The inclusion of calibration and tire modeling processing in IC 44's functionality also enables this technology to be applied to very low cost tire alarm systems which will also be non-RF variants. This will considerably extend commercial opportunities to applications such as bicycles and motorcycles and widen the automotive use. For these non-RF variants valve core 24 and IC 44 remain unchanged. However, a non-RF variant of a "transponder" (not shown) will interconnect the alarm discrete signal to cap 28 containing a battery and an alarm (e.g., a flashing LED and/or an audible beep). The "transponder" of this application will also a battery voltage monitor to signal replacement of cap 28's battery if necessary. The indica for low battery will be distinguishable from tire alert indica.

Other Embodiments (FIG. 10)

FIG. 10 shows portions of significance for other embodiments of my valve/transducer and system invention. For example, FIG. 10A shows one of several pressure transducer alternatives to transducer 58. In the figure for a fiber optic valve core 196, as shown, a pressure transducer 198 interfaces with a high-quality optical polymer fiber interface 200.

Transducer 198 can be implemented with known photonic or fiber-optical technology consisting of a very simple microstructure. A first microscopic suspended silicon beam attaches at both ends to a silicon diaphragm substrate. This first beam has a natural resonant vibrational mode whose oscillation frequency depends upon tension exerted by the pressure diaphragm in strain. Its resonant frequency will also vary as a function of temperature. A second microscopic suspended silicon beam is free at one end and therefore has a vibrational mode with oscillation frequency dependent only on temperature. Each suspended beam is excited into resonance by pulsed light from fiber 200. Fiber 200 also receives reflected light from the vibrating beams which is detectable by conventional photonic and electronic processing techniques. In valve core 196 implemented thusly, transducer 198's silicon substrate will be a passive (i.e., non-electronic) mechanical structure. Signal processing circuits and fiber-optical LED's and components will be added to RF circuits in a transponder structure similar to 26. However, a photonic transponder (not shown) is also feasible.

Other embodiments involve alternatives in placement of components within a valve core structure. For example, FIG. 10B shows how a silicon micromachined pressure transducer die 204 can be placed on the distal end of a valve cup 202. In this embodiment die 204 is in pressure communication with tire interior pressure and interconnecting wires pass through a hollow pin actuator 206 from distal end where they bond to die 204 input/output pads to a proximal end electrical connector (not shown). Adhesive filling in hollow pin 206 seals the pressure barrier.

Other mounting positions of a pressure die 204 are possible as shown in FIG. 10C. This figure shows a barrel 224 constructed in two parts for weldable assembly. Prior to welding pressure die 204 is adhesively mounted to pedestal 226 which communicates through a pressure sampling hole 228. Thus the underside of die 204 is in pressure communication with the tire interior pressure through hole 228. Die 204 interconnects via a flex circuit (not shown) similar to flex 76. After convential wire bonding between flex circuit and mounted die, then barrel top assembly mounts over the distal assembly. Weld techniques similar to standard electronic manufacturing processes permanently attach the assembly parts.

Partial Listing of More Embodiments

The following paragraphs contain, without figure reference, additional alternative embodiments. These are examples of embodiments within the scope of my claims. However, the list presented here should not limit the claims.

Alternative Forms

There are alternative forms of various parts described earlier. Some of these are: barrel indentation 45 in alternate position or shape; pin 34 in alternate shape; nut 42 in alternate shape; IC 44 in alternate shape, dimension, and/or construction; transducer 58 in absolute pressure measuring form; transducer 58 in differential (or gauge) pressure form; IC 44 with multiple transducers 58; spring 38 in alternate positions or shapes or in multiple combinations; flex circuit 76 with alternate shape or with fewer or with more coils; transponder 26 and/or cap 28 in alternate shape or dimension; alternate forms of hand-held unit 120; alternate forms of chassis subsystem 160 and/or its components; alternate indica or controls and/or outputs; alternate materials for any or several parts (e.g., a molded ceramic barrel with multilayer printed conductors); combinations of several or many of the above listed alternative forms.

Alternative Functions

There are many alternative embodiments which involve modification of functions described earlier. With regard to pressure transducer(s) sensing method alone there are many, such as: a pressure transducer with capacitive sensing; a pressure transducer with photonic sensing (e.g., as described earlier and others); a pressure transducer based upon electron tunneling current; a pressure transducer with surface machined three-dimensionally released microstructures in vibration and/or static displacement sensing; microstructure pressure switches; combinations or variation of these. Other alternative function embodiments include: flexible fiberoptic interface between a valve core and transponder; alternate asynchronous serial data between a valve core and transponder; transmit only RF circuits in a transponder equivalent assembly; variations in data interfaces; photonic rather than RF transponder circuits; combinations of several or many of these. There are alternative energy sources to a battery which can be conceived—such as a miniature AC generator in a cap. For example a generator comprised of a imbalanced high flux magnetic rotor (imbalance causes rotation when vehicle operates) suspended by jewel pivots in a wire-wound stator. Alternative function forms include: analog signal processing substituted for digital signal processing or vice-versa; alternative processing algorithms or mathematical models; systems without battery conservation circuits; systems which have more or less integration with vehicular displays, processors, or data sources; valve cores with electrically operated (solenoid coil) valve cups wherein proximal end of actuating pin becomes a miniature switch; valve cores with microstructure valves and actuators wherein pin becomes a miniature switch; combinations of several or many of these.

Natural Extensions

There are also embodiments within the scope of my claims which are natural extensions of the above. These include a miniature transducer only (i.e., without valves) wherein barrel 30 is closed at its distal end and pin 34, cup 32 etc. are ommitted. Such a miniature valve will be much smaller than present electronic pressure transducers which are commercially produced. In general these are packaged according to constraints of present electronic printed wiring substrates (e.g., printed wiring boards, ceramic and MCM substrates—and generally in more or less rectangular solid shapes). Application of these transducers requires mechanical "plumbing" to pipe pressure to input ports on the devices. My invention as a transducer can be significantly smaller. Preparation of an application will be simply a matter of drilling, boring, and tapping an appropriately dimensioned and finished hole in a pressure container and installing my invention. Electrical connection to a connector within the installation nut will provide an extremely adaptable interface without expense, size, and weight of mechanical "plumbing". Transducer core dimensions can be much smaller than valve core dimensions enabling lightweight but powerful pneumatic actuator systems to be constructed.

Another natural extension is incorporation of electronically controlled microvalves implemented in the same microstructure substrate as the pressure transducers.

Further amplifying the embodiments there are combinations involving elements the multiple lists expressed above.

CONCLUSIONS, RAMIFICATIONS, AND SCOPE

My valve/transducer invention successfully implements a novel concept in the primary field of pneumatic tire pressure gauging and inflation alarming in combination with tire inflating valves. Numerous prior art inventions have failed to solve the significant technical problems addressed by my invention. Evidence of the novelty of the present invention is the teaching away from its approach by the prior art both in the primary field of invention and in systems of other types. Accuracy of pressure measurement provided by my invention enables advanced condition assessment by digital processing which is also a subject of my invention. More informative displays of tire condition and status will enhance the useability and hence the marketability of my system.

My valve core design and associated system components addresses commercialization of the potential market in this field of invention with a design suitable for the broadest possible range of applications. This is in contrast to prior art whose designs relegated potential products to minor niche markets. My valve/transducer and system invention has high potential to capture a significant share of the available market. The components are relatively simple to construct and assemble at economical prices and the design provides useful features which will attract consumer interest.

The ramifications of my invention extend significantly beyond the scope of the primary field of the invention. I have presented many alternative embodiments which relate to the field of invention and their natural extensions. The scope of the described embodiments is broad. The various combinations of embodiments is broader still but it is impossible to present all possible embodiments.

Thus the scope of my invention should be determined by the appended claims and their legal equivalents, rather than by the examples given.

I claim:

1. An improved method of pressure measuring, wherein improvements are made in placing a miniaturized pressure measuring device into contact with a medium of pressure to be measured, and wherein said improved method comprises the steps of:
    (a) providing an assembly comprising an appropriately shaped and dimensioned pressure transducer assembled into an appropriately shaped and dimensioned housing, said housing having an inner and an outer surface, said inner and outer surfaces being opposite of each other, said housing having an appropriate opening between said opposite surfaces for said shaped pressure transducer to be placed such that said pressure transducer extends at least part way through from one surface to the opposite, and said pressure transducer being substantially an integrated circuit with an improved shape,
    (b) providing within said pressure transducer a means for signaling a measured pressure value to the opposite surface of said housing from the surface to which the medium of pressure to be measured is applied,
    (c) providing a means of mating said assembly with an appropriately sized and shaped sealable opening of a container holding said pressure medium or with a similar opening of a tube in communication with the pressure medium, and upon mating creating a seal between said assembly, including said housing, and said sealable opening such that the pressure medium does not leak from the sealed opening,
    (d) mating said assembly into said sealable opening, afterward applying pressurized medium to the mated assembly, and
    (e) thereafter measuring pressure by means of said transducer and signaling at least one parameter indicative of the applied pressure.

2. An improved method of pressure measuring wherein, in combination with the method of claim 1, the additional step of compensating errors of said transducer according to a predetermined compensation algorithm is included.

3. An improved method of pressure measuring wherein, in combination with the method of claim 2, the additional steps of measuring temperature of the pressurized medium and compensating indicated parameters in accordance to predetermined functions of pressure and temperature are included.

4. An improved method of pressure measuring wherein, in combination with the method of claim 1, the additional step of transmitting said indicative parameters to a remote indicating means is added, said transmitting step being performed by a transmitting means selected from the group consisting of wireless transmitter/receiver paired circuits, optical transmitter/receiver paired devices, and electrical wiring.

5. A transducer apparatus mountable in a passage between an interior and an exterior of a pressure container for sensing pressure of a fluid in said interior, comprising:
    a valve core having a barrel and a movable member with a first surface selectably movable between a closed position in which said first surface is in sealing engagement with another surface to prevent fluid flow through said passage and an open position in which said first surface is not in sealing engagement with said second surface to allow fluid flow through said passage;
    a pressure transducer attached to said valve core, said pressure transducer comprising at least one integrated circuit mounted at least part way through an opening in a wall of said barrel; and
    a transmission circuit coupled to said pressure transducer for transmitting a signal responsive to said pressure to a remote location.

6. The transducer apparatus recited in claim 5, wherein said transmission circuit is selected from the group consisting of a wireless circuit, a wired circuit, and an optical circuit.

7. The transducer apparatus recited in claim 5, wherein said barrel has a tapered portion correspondingly tapered to mate in sealing engagement with a tapered portion of said passage.

8. The transducer apparatus recited in claim 6, wherein said pressure container is a vehicle tire, and said passage is an inflation valve stem of said vehicle tire.

9. The transducer apparatus recited in claim 6, wherein said valve core further has a mounting end with a grippable installation member and a threaded ring, said mounting end is relatively rotatable with respect to said barrel, and said threaded ring is threadably engageable in said passage in response to rotation of said installation member while relative rotation of said mounting end and said barrel is inhibited by frictional engagement between said tapered portion of said barrel and said tapered portion of said passage.

10. The transducer apparatus recited in claim 6, wherein said pressure container is a vehicle tire, and said passage is an inflation valve stem of said vehicle tire.

11. The transducer apparatus recited in claim 5, further comprising:
    a receiving circuit at said remote location for receiving said signal responsive to said pressure;
    a signal processor at said remote location coupled to said receiving circuit; and
    an indicator coupled to said signal processor for providing an indication in response to said pressure.

12. The transducer apparatus recited in claim 11, further comprising a receiving circuit at said remote location for receiving said signal responsive to said pressure;

a signal processor at said remote location coupled to said receiving circuit; and an indicator coupled to said signal processor for providing an indication in response to said pressure.

13. The transducer apparatus recited in claim 11, wherein said signal processor comprises:

a transducer pressure error calibrator for providing a calibrated pressure signal output; and a mathematical modeling means for evaluating said calibrated pressure signal with respect to its being numerically less than or greater than a predetermined limit value.

14. The transducer apparatus recited in claim 11, wherein said pressure transducer and said transmission circuit are integrally formed on said integrated circuit.

15. A transducer apparatus mountable in a passage between an interior and an exterior of a pressure container for sensing pressure of a fluid in said interior, comprising:

a transducer apparatus body having a barrel and a mounting end, said mounting end having a first engagement engageable with a second engagement in said passage;

an integrated circuit mounted partially inside said transducer apparatus body, a portion of said integrated circuit sensitive to said pressure protruding through an opening in a wall of said barrel; and a transmission circuit coupled to said pressure transducer for transmitting a signal responsive to said pressure to a remote location.

16. The transducer apparatus recited in claim 11, wherein:

said pressure container is a vehicle tire, and said passage is an inflation valve stem of said vehicle tire; and said transducer apparatus body is a vehicle tire valve core.

* * * * *